United States Patent [19]

Suman et al.

[11] Patent Number: 5,479,157
[45] Date of Patent: Dec. 26, 1995

[54] REMOTE VEHICLE PROGRAMMING SYSTEM

[75] Inventors: Michael J. Suman; Mark L. Zeinstra, both of Holland, Mich.

[73] Assignee: Prince Corporation, Holland, Mich.

[21] Appl. No.: 390,241

[22] Filed: Feb. 17, 1995

Related U.S. Application Data

[63] Continuation of Ser. No. 177,710, Jan. 5, 1994, abandoned, which is a continuation of Ser. No. 782,109, Oct. 24, 1991, abandoned, which is a continuation-in-part of Ser. No. 467,541, Jan. 19, 1990, Pat. No. 5,113,182.

[51] Int. Cl.$^6$ ..................................................... G06F 7/04
[52] U.S. Cl. .............................. 340/825.31; 340/825.44; 340/825.69
[58] Field of Search .......................... 340/825.31, 825.44, 340/825.69, 825.72, 426, 543; 307/10.1, 10.2, 10.5; 180/287; 379/56, 57; 455/38.4

[56] References Cited

U.S. PATENT DOCUMENTS

| | | | |
|---|---|---|---|
| 3,824,469 | 7/1974 | Ristenbatt | 340/825.44 |
| 4,143,368 | 3/1979 | Route et al. | 340/825.31 |
| 4,515,994 | 5/1985 | Bolle et al. | 379/57 |
| 4,665,379 | 5/1987 | Howell et al. | 340/426 |
| 4,747,122 | 5/1988 | Bhagat et al. | 379/57 |
| 4,754,255 | 6/1988 | Sanders et al. | 340/426 |
| 4,794,368 | 12/1988 | Grossheim et al. | 340/426 |
| 4,809,316 | 2/1989 | Namekawa | 340/825.31 |
| 4,827,520 | 5/1989 | Zeinstra | 381/43 |
| 4,845,708 | 7/1989 | Herrmann, Jr. et al. | 307/10.1 |
| 4,849,750 | 7/1989 | Andros et al. | 340/825.44 |
| 5,040,990 | 8/1991 | Suman et al. | 439/34 |
| 5,113,427 | 5/1992 | Ryoichi et al. | 379/57 |
| 5,146,215 | 9/1992 | Drori | 340/825.69 |

OTHER PUBLICATIONS

PMR 2000, Personal Message Receiver, POCSAG (CCIR Radio Paging Code #1), Motorola, 1986.

*Primary Examiner*—Donald J. Yusko
*Assistant Examiner*—Edwin C. Holloway, III
*Attorney, Agent, or Firm*—Price, Heneveld, Cooper, DeWitt & Litton

[57] ABSTRACT

Vehicles embodying the present invention include a receiver, demodulator and control circuit which interfaces with various vehicle options to allow receipt of a vehicle address and control signal which is a personalization code to control the operation of one or more vehicle accessories. A display is provided for the display of information to the vehicle operator confirming the state of operation of an option change or addition when has been requested by the vehicle operator. In one embodiment of the present invention, the vehicle includes a display for displaying a telephone number from a land-based paging system to the vehicle operator. In another embodiment of the present invention, the receiver demodulator and display unit receives alpha-numeric information when allows messages and/or telephone numbers to be displayed to the vehicle operator. In yet a further embodiment of the invention, one vehicle personalization control system provides anti-theft protection such that upon receipt of a predetermined code, once the vehicle ignition has been turned off, the vehicle cannot be restarted.

23 Claims, 15 Drawing Sheets

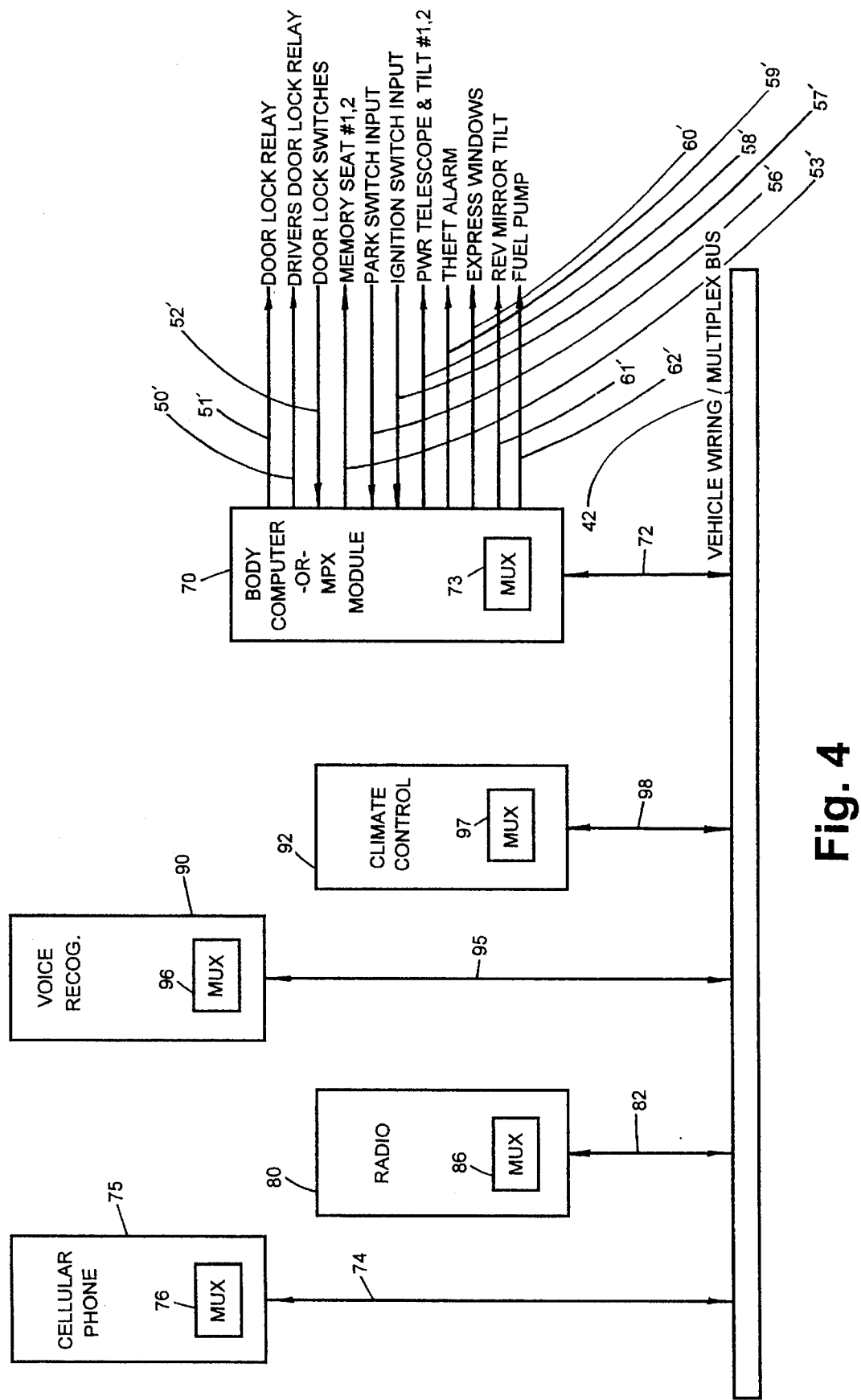

REMOTE VEHICLE PROGRAMMING SYSTEM

This is a continuation of application Ser. No. 08/177,710, filed Jan. 5, 1994, now abandoned, which is a continuation of application Ser. No. 07/782,109, filed Oct. 24, 1991, now abandoned, which is a continuation-in-part of Ser. No. 07/467,541, filed Jan. 19, 1990, now U.S. Pat. No. 5,113,182.

BACKGROUND OF THE INVENTION

The present invention relates to a system for remotely programming options of a vehicle and for communicating with the vehicle.

As vehicle electronic systems and options become more sophisticated, vehicle owners have many new options for vehicle accessories from which to choose. In recent years it has been proposed to allow the vehicle owner to selectively control the operation of vehicle options through vehicle programming systems. U.S. Pat. No. 5,040,990 issued on Aug. 20, 1991, for example, discloses one system in which selected vehicle options can be programmed by the vehicle operator. U.S. patent application Ser. No. 07/567,390, filed Aug. 14, 1990, and entitled ELECTRICAL CONTROL SYSTEM FOR VEHICLE OPTIONS also discloses a system in which a variety of vehicle options can be selected by the vehicle operator from the vehicle itself. Parent application Ser. No. 07/467,541, entitled VEHICLE SYSTEMS CONTROL, filed on Jan. 19, 1990; now U.S. Pat. No. 5,113,182 and U.S. patent application, Ser. No. 07/685,880, entitled MODULAR MIRROR WITH ELECTRICAL ACCESSORIES, filed Apr. 15, 1991, now abandoned, also disclose electrical systems in which a variety of options can be selected and controlled by the vehicle operator.

These systems present a significant advance over present option availability in which a vehicle is ordered with pre-installed options which typically cannot be changed by the vehicle operator. As vehicle electronics become more sophisticated, the vehicle itself can include the electrical controls and circuits for multiple options at a relatively low cost. The electrical circuits, which typically include a microprocessor, can be selectively programmed, as described in the above identified patent applications, to change the selected options for different vehicle operators under the control of the vehicle operator. There exists a need, however, for vehicle owners and operators who are not electrically or mechanically inclined to be able to have such selectable options activated or deactivated without the inconvenience of a service visit to the car dealership.

Vehicles have also become more important in conducting business where, in recent years, advances in telephone communications between a vehicle and land based telephone systems have allowed quality communications between a vehicle operator and land based facilities. As a result of such advances, it is now possible in many areas to communicate directly with the vehicle operator via telephone links. Most vehicles, however, do not include telephones as part of an original installation and require subsequent post-purchase installation and monthly charges as well as on-line charges which can become somewhat prohibitive. As a result, there exists a need for an electronic communication system which allows inexpensive one-way communication with a vehicle and means in a vehicle for receiving and displaying to the vehicle operator the receipt of information in a variety of forms.

SUMMARY OF THE INVENTION

The system of the present invention provides for the receipt of control information from a land-based facility such as a car dealership service department for remotely controlling selected options. Vehicles embodying this aspect of the present invention include a receiver, demodulator and control circuit which interfaces with various vehicle options to allow receipt of a vehicle address and control signal which is a personalization code to control the operation of one or more vehicle accessories. A display is provided for the display of information to the vehicle operator confirming the state of operation of an option change or addition which has been requested by the vehicle operator.

In one embodiment of the present invention, the vehicle includes a display for displaying a telephone number from a land-based paging system to the vehicle operator. In another embodiment of the present invention, the receiver demodulator and display unit receives alpha-numeric information which allows messages and/or telephone numbers to be displayed to the vehicle operator. In yet a further embodiment of the invention, one vehicle personalization control system provides anti-theft protection such that upon receipt of a predetermined code, once the vehicle ignition has been turned off, the vehicle cannot be restarted.

In all embodiments of the present invention, the vehicle includes a receiver and demodulator which are coupled to a control circuit and display means. This electrical system is responsive to receive signals for controlling vehicle options and/or displaying to the vehicle operator information from a land-based transmitter. In systems embodying the present invention, the land-based transmitter provides an address unique to each vehicle and signal information which is received by the vehicle and displayed to the vehicle operator. In one embodiment of the present invention, multiple addresses are assigned to a vehicle with one address being used for informational display only and a second address being used by automobile dealers for transmitting option personalization control signals to a vehicle upon request from the vehicle operator. These and other features, objects, and advantages of the present invention will become apparent upon reading the following description thereof together with reference to the accompanying drawings in which:

BRIEF DESCRIPTION OF THE DRAWINGS

FIG. 4 is an electrical circuit diagram in block form of an optional interface circuit associated with the electrical circuit shown in FIG. 3;

DETAILED DESCRIPTION OF THE PREFERRED EMBODIMENTS

Figure 1:
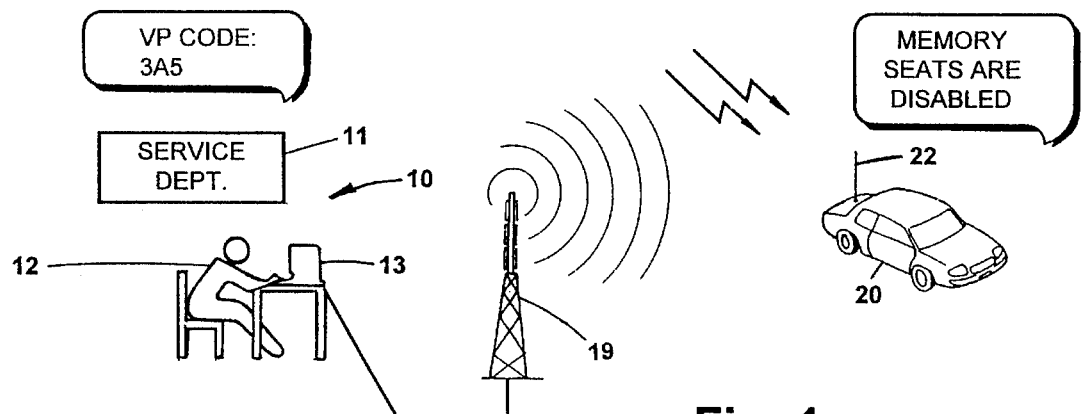
FIG. 1 is a schematic diagram of a system embodying the present invention.

Referring initially to FIG. 1, there is shown a land-based installation and vehicle embodying one preferred embodiment of the present invention. The land-based system is designed for controlling a variety of selectable vehicle options for a plurality of vehicles each of which include the remotely programmable electrical control system of the present invention. The land-based facility 10 can be a car dealership, for example, or an independent facility which includes a service department 11 for providing the transmission of control signals to vehicles subscribed to the system, typically the service department of an automotive dealership from whom the vehicle 20 was purchased.

Figure 2:
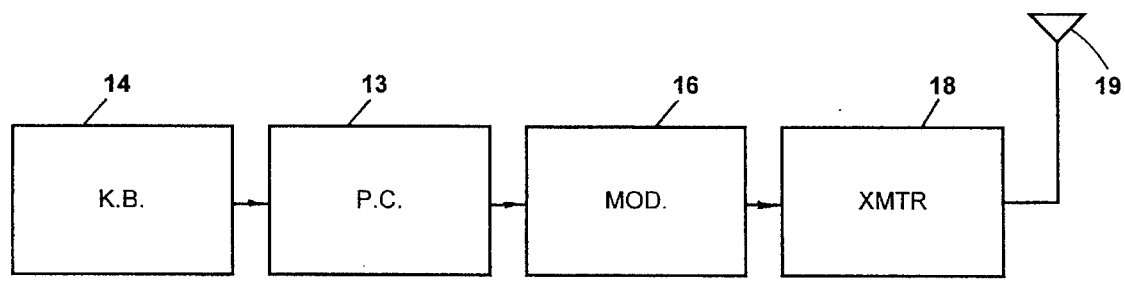
FIG. 2 is an electrical circuit diagram in block form of the land-based facility illustrated in FIG. 1.

The service department includes an operator 12 with access to a computer terminal 13 with a keyboard 14 (FIG. 2). The terminal can be a typical PC with an RS-232 data output port coupled to a modulator 16 in turn coupled to a transmitter 18 for transmitting address and control signals by an antenna 19 (FIGS. 1 and 2) to the receiving antenna 22 of a vehicle 20. It is understood that nationwide there will be a sufficient number of land-based facilities to service vehicles in the system. As satellite communications improve, it will be possible for a single facility to send such information using DBS (direct broadcast satellite) in which the vehicle antenna is a satellite receiving antenna. Alternatively, satellite communications can be used as one link through several land-based relay stations.

In the system shown in FIG. 1, the operator 11 will receive a request from a vehicle owner, typically by a normal telephone request, that a certain vehicle option is either to be enabled or disabled. Such an option may, for example, be the activation or deactivation of a "last door locks all doors" feature. The operator 11 responds to the request which identifies the vehicle either by owner or VIN number (or both) by entering in keyboard 14 the vehicle code which is typically an address associated with the particular vehicle and a command associated with the requested personalization of the vehicle option change for such vehicle. This signal is transmitted by the service department using the equipment shown in FIG. 2 and received and demodulated by the vehicle system as described in greater detail below in connection with FIGS. 3 and 4 which responds to the data command to carry out the command control function.

A variety of modulation schemes can be used for the transmission of information between land-based facilities and vehicles, however, standard commercially available GSC or POCSAG paging systems are presently preferred. In the FIG. 1 schematic diagram shown, the vehicle address or personalization code can be two 18 bit words in the standard GSC paging format which uniquely identifies each vehicle in the system. Following the address for the vehicle, the actual command data is sent which in this paging format can be up to 8 words of 15 bits each. Other paging formats such as the POCSAG format can also be employed which also provides address code words and message code words. These two formats are set forth in detail in Appendix A to this specification.

Figure 3:
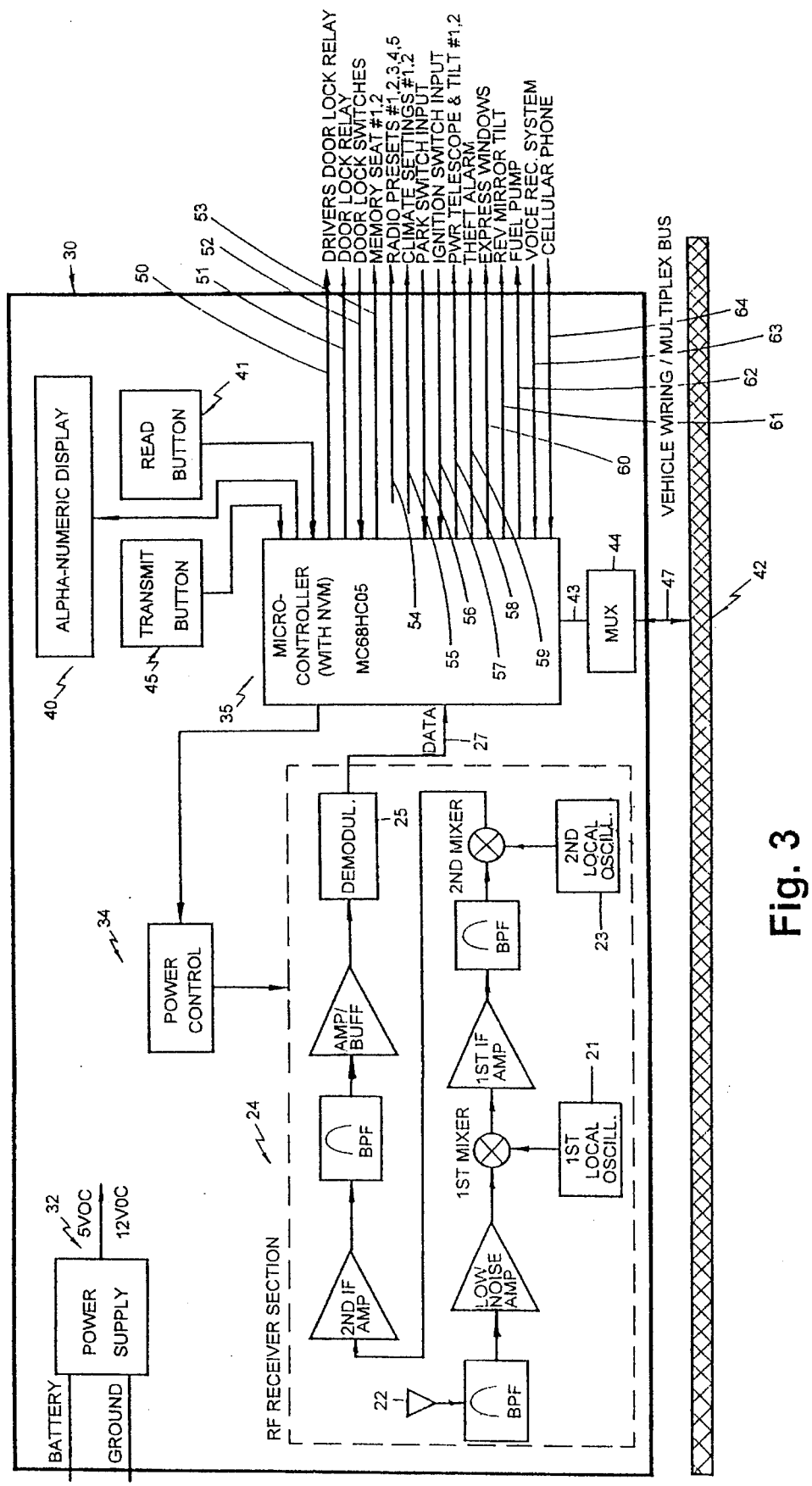
FIG. 3 is an electrical circuit diagram in block form of the vehicle electrical circuit embodying the present invention which is used in association with the systems shown in FIGS. 1, 2, 6 and 7.

In the example shown in FIG. 1, the vehicle operator has requested that the memory seat be disabled and the necessary command control is transmitted to the vehicle electrical control system 30 shown in FIG. 3 which includes the vehicle antenna 22 and a receiver and demodulator shown by block 24 for receiving the vehicle address and command control and applying it to a microcontroller 35. Once received and decoded, the command control is executed as described below and an indication that the command has been received and executed is provided on the alpha-numeric display 40 in the vehicle.

In the installation shown in FIGS. 1 and 2, the modulator 16 responds to the vehicle identification code and the command control signal entered on keyboard 14 and transmitted by conventional commercially available modulator 16 and transmitter 18 to provide the desired address and command control in either the GSC or POCSAG paging formats. Transmitter 18 typically operates on a frequency within the 137–175 MHz (VHF band) or within the 405–513 MHz (UHF band) while the modulator provides FM FSK tone modulation for the RF carrier signal to provide a composite output signal at transmitting antenna 19 which provides the address and command data information to vehicles which are part of the system. Typically, the receiver will be an integral part of the vehicle when purchased and the dealer can either include the options select control system as part of the vehicle cost or can provide it as a monthly subscription service to the vehicle owner. Access to the unique vehicle identification code address for controlling options, however, will typically only be available to the vehicle dealer or associated service centers.

The vehicle electrical control system 30, is shown in FIGS. 3 and 4, and includes as shown in FIG. 3, a microcontroller such as a Motorolla MC68HC05 which receives demodulated signals from the receiver 24 shown enclosed within dotted lines in FIG. 3 via a data bus 27. The receiver 24 is a typical dual conversion receiver having first and second local oscillators 21 and 23, appropriate bandpass filters and amplifiers, and a demodulator circuit 25 which provides digital data output on a data bus 27 to an input of microcontroller 35. The microcontroller 35 includes an integral non-volatile memory for retaining data when the vehicle is not in operation. In vehicles including a single wire multiplex bus 42, an output terminal 43 of circuit 35 is coupled to the input of a multiplex communications circuit 44 comprising a 28 pin integrated circuit which is coupled by output conductor 47 to a single wire data bus 42. The average data rate for the multiplex circuit 44 is 10.4 kilobits per second. The microcontroller 35 communicates with circuit 44 through its SPI serial interface port 43. When circuit 44 receives a message over the bus 42 it interrupts the microprocessor which in turn initiates communication with the circuit through its SPI port. The microprocessor 35 then reads the data from the SPI register and acts upon the information. The multiplexing scheme is set forth in SAE standard J1850 and is universally used in the automotive industry.

The vehicle control system 30 includes a power supply 32 which supplies regulated 5 and 12 volt DC to the various individual circuit blocks shown in FIGS. 3 and 4 with the conventional power circuit interconnections not being shown for the sake of simplification of the drawings. Circuit 30 also includes a power control circuit 34 which is coupled to power supply 32 and between the microcontroller and receiver 24 to selectively activate and deactivate the receiver periodically in order to save power as described in greater detail below in connection with the flow diagram of FIG. 5. The vehicle electrical control circuit 30 further includes an alpha-numeric vacuum florescent-type display 40 which is coupled to the microcontroller 35. Circuit 40 includes suitable driver circuits as well as the display itself. A push-button read switch 41 is coupled to the microcontroller and a transmit control push-button switch 45 is also coupled to the microcontroller 35. As will be described below, switches 41 and 45 are operator actuated switches which selectively scrolls the information displayed on the display 40 and allows memory control of such information. In the case of an automatic phone dialing system, the transmit switch 45 can be employed for activating a sequence of controls which cause a cellular telephone, if installed in the vehicle, to automatically dial a number displayed on the vacuum florescent display 40.

Coupled to the microcontroller are a plurality of input/output ports 50–64 which provide control output signals or receive input status signals from a variety of vehicle interface controls and circuits identified in the drawings. Depending upon the specific microcontroller used, conventional interface circuits between the microcontroller and the input/output lines 50–64 may be required as is well known in the art. In the system shown in FIG. 3, the output terminals 50–64 can be coupled directly to one or more of the variety of control systems shown such as the electrical fuel pump system shown by data bus 62, the ignition switch input 56 and the like. Similarly, instead of directly coupling the microcontroller as shown through the data busses 50–64 many vehicles will include a single wire data bus 42, which as seen in FIG. 4, intercouples the same control information from microcontroller 35 and receipt of information through the data bus 42 instead of directly through conductors 50–64. In this instance, many of the conductors 50–64 can be eliminated and the controls are accomplished though an interface microcontroller 70 of the type disclosed in parent U.S. patent application Ser. No. 07/467,541, filed Jan. 19, 1990, and entitled VEHICLE SYSTEMS CONTROL, now U.S. Pat. No. 5,113,182 the disclosure of which is incorporated herein by reference. For the sake of comparison, the output conductors of microcontroller 70 corresponding to those of microcontroller 35 are identified by similar reference numerals carrying a superscript prime symbol. Thus, the vehicle control circuit 30 shown in FIGS. 3 and 4 will be capable of communicating through the data bus 42 or directly from microcontroller 35 to the various interface controls. The microcontroller 70 is coupled by conductor 72 to bus 42 through a multiplex chip 73 of the same type as circuit 44 to provide two-way communication between the two microcontrollers. In the event it communicates through the data bus 42, additional control circuits as now described are employed.

In the FIG. 4 embodiment of the control circuit 30, a cellular phone 75 is mounted in the vehicle and communicates with bus 42 through a data link 74 and a multiplex interface chip 76. Similarly, the vehicle includes an AM/FM radio 80 coupled to bus 42 through dataline 82 and also includes a multiplex interface chip 86. The vehicle may include a voice recognition system 90 of the type described in U.S. Pat. No. 4,827,520, issued May 2, 1989, and entitled VOICE ACTUATED CONTROL SYSTEM FOR USE IN A VEHICLE, the disclosure of which is incorporated herein by reference. In the event the system includes such a voice recognition and control system, data bus 42 is employed in connection with the voice recognition circuitry which operates in conjunction with microcontroller 70 to provide the desired control of the various vehicle functions. Voice recognition circuit 90 is coupled through a multiplex circuit 96 and conductor 95 to bus 42. The vehicle may also include an electronic climate control system 92 which has a multiplex interface chip 97 which couples to bus 42 via the conductor 98.

Figure 5A:
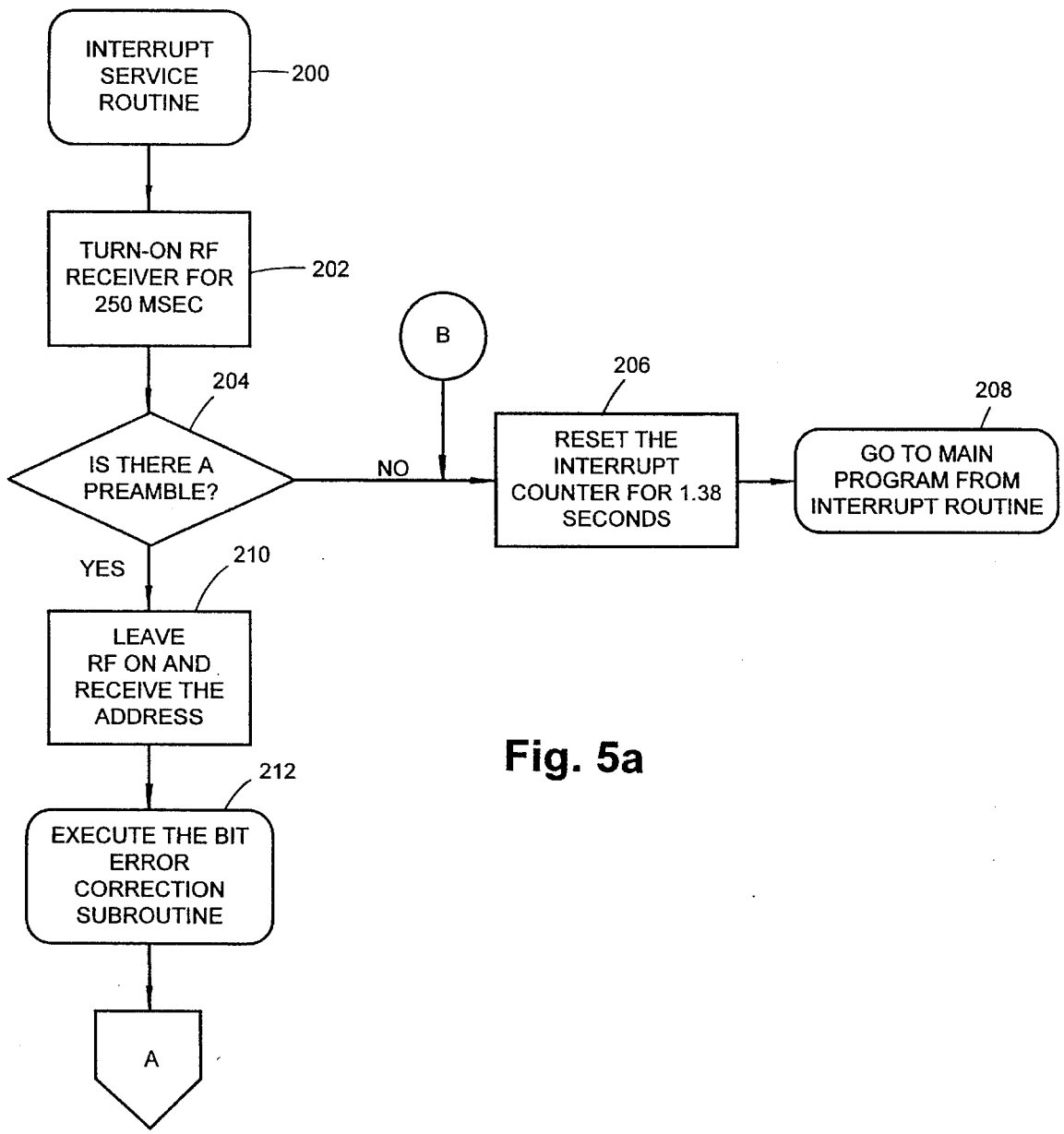
FIGS. 5A–5K are flow diagrams of the program employed with the microprocessor shown in FIG. 3.
Figure 5B:
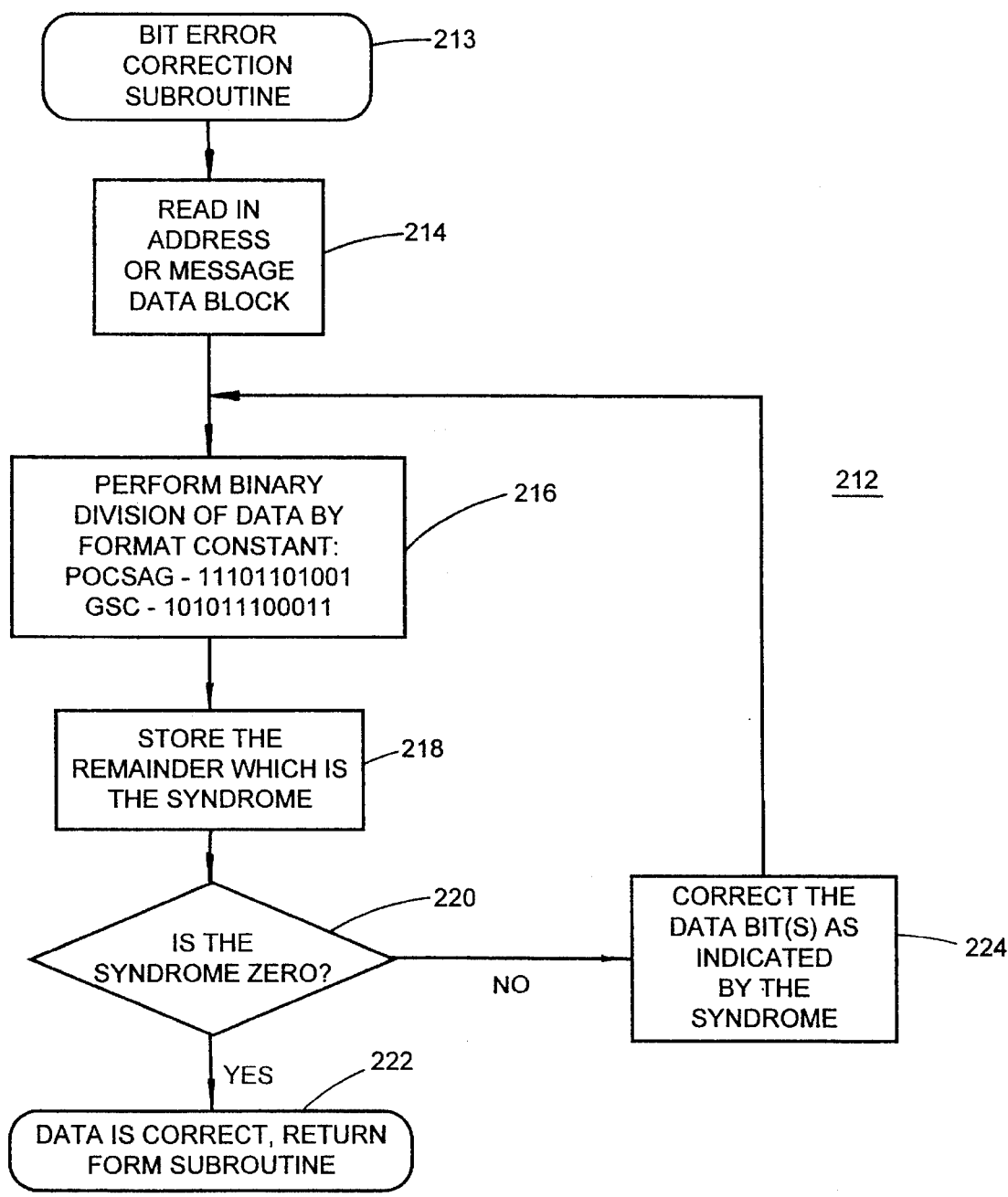
Figure 5C:
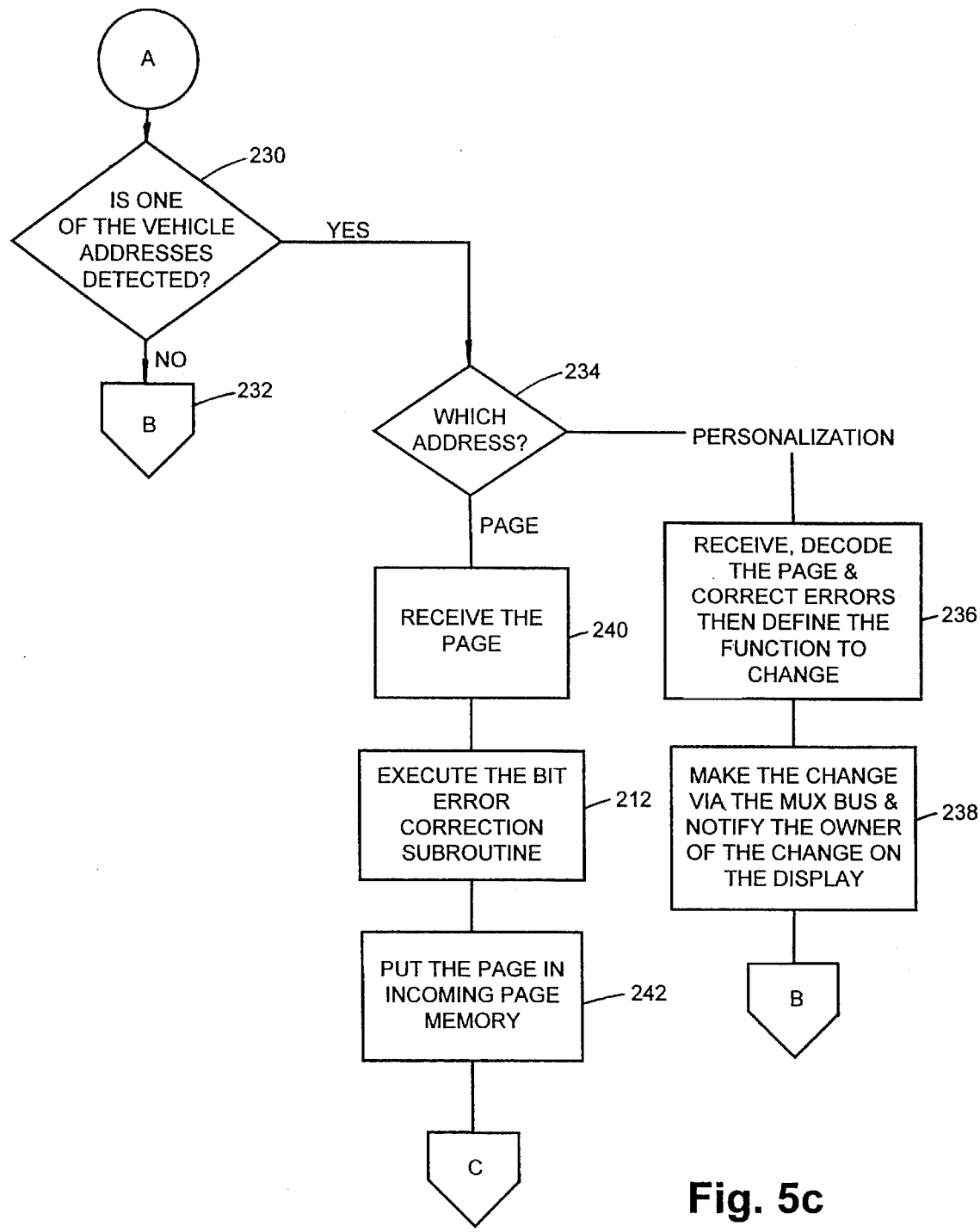
Figure 5D:
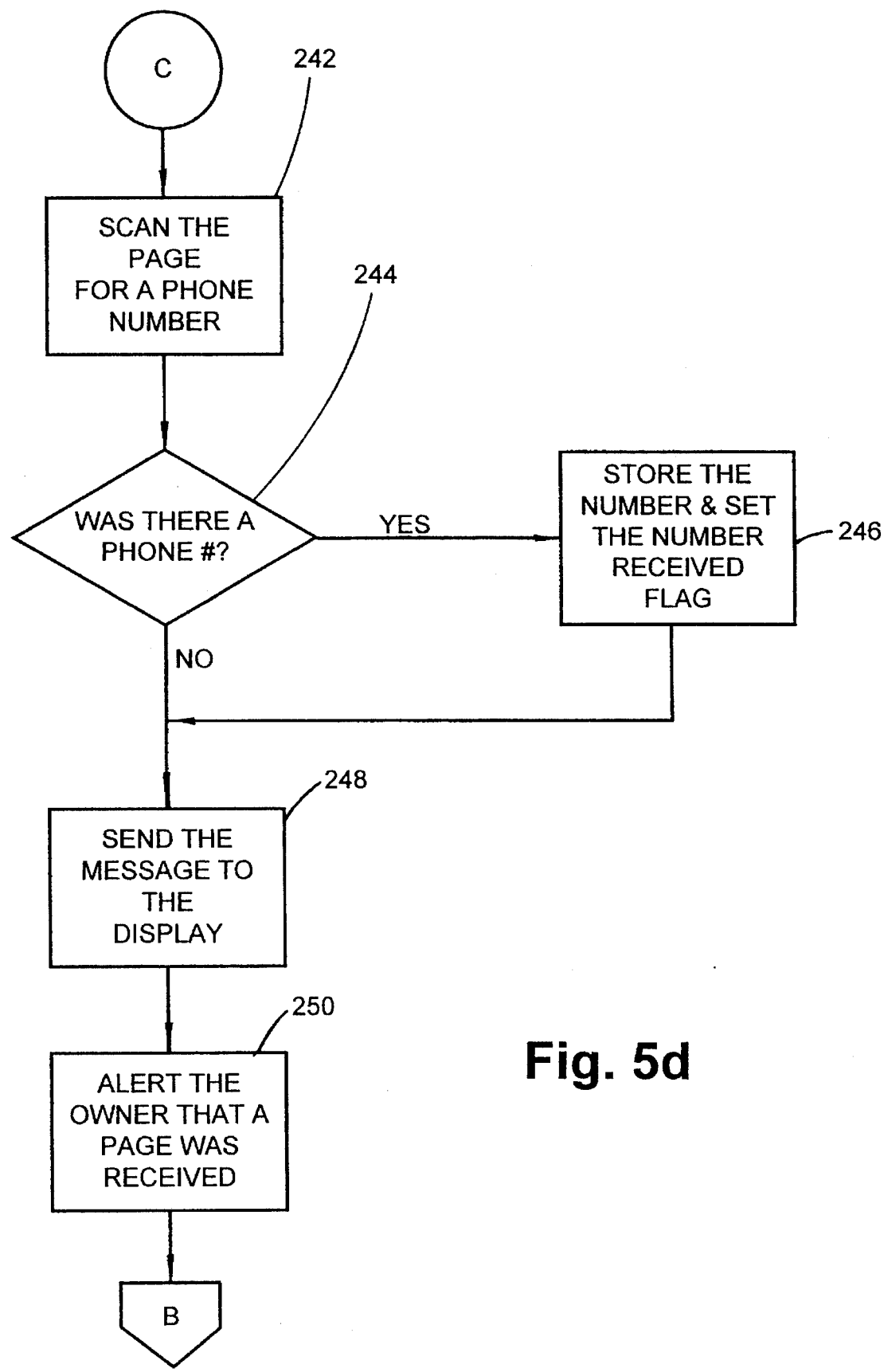
Figure 5E:
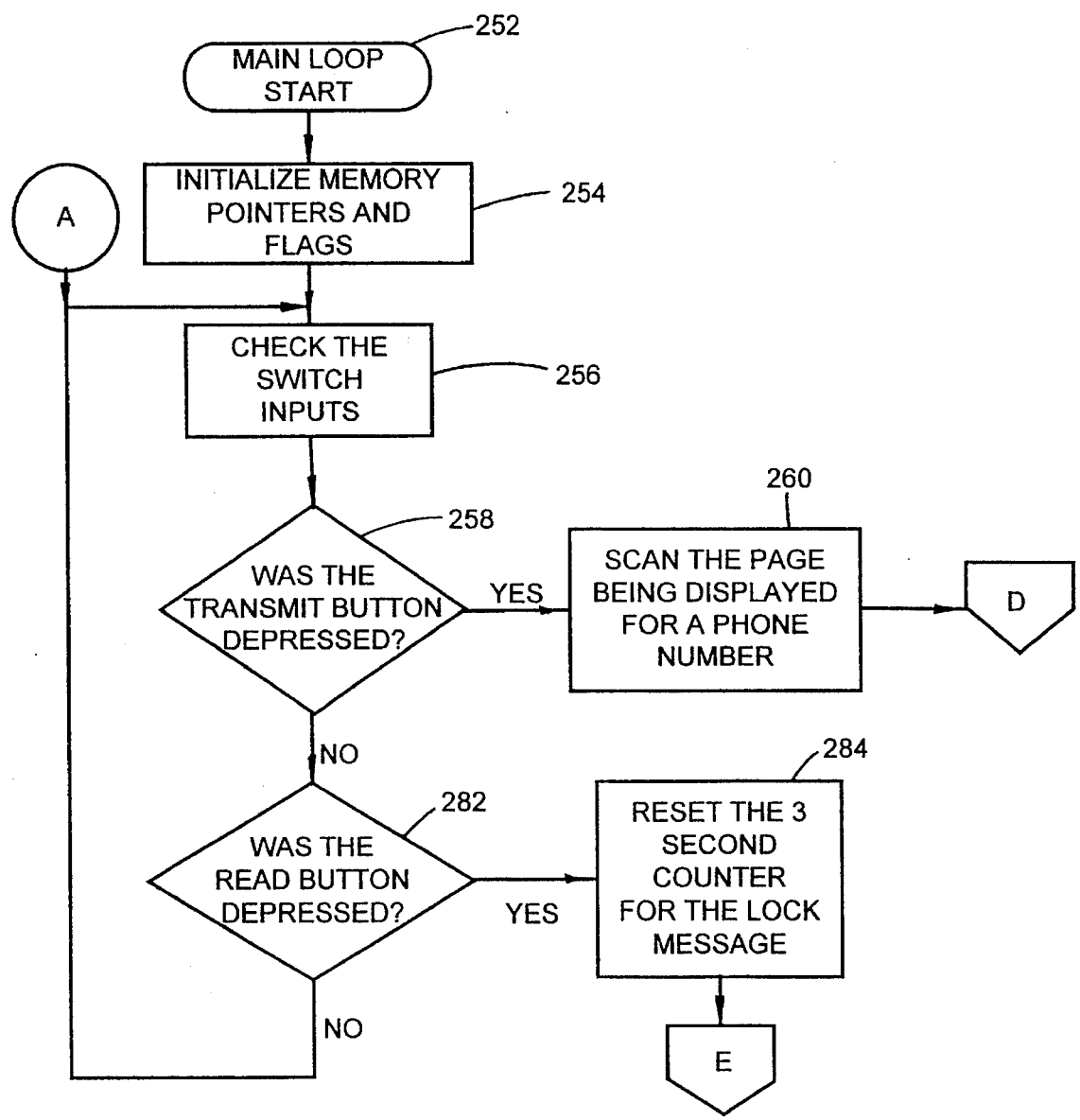
Figure 5F:
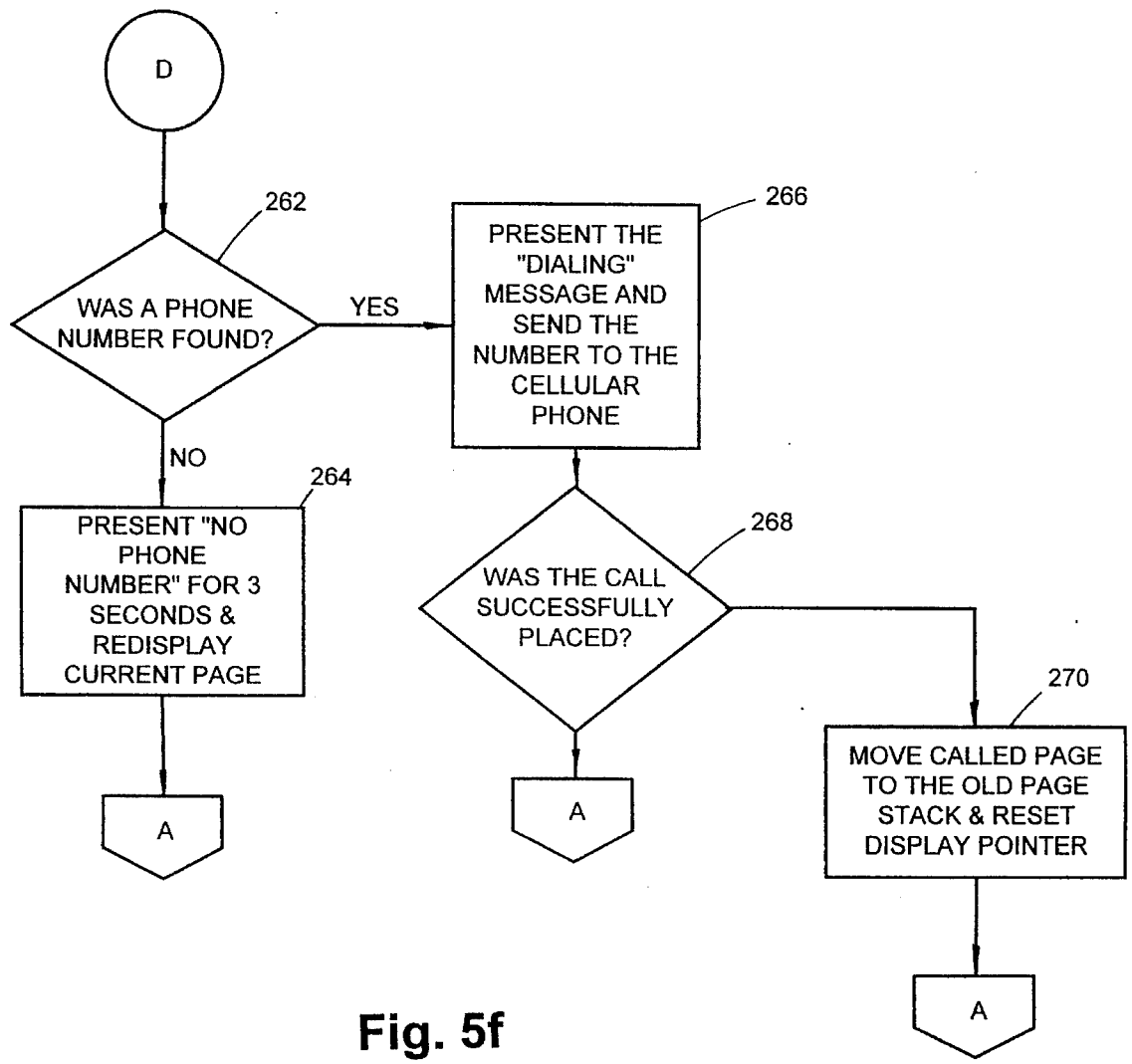
Figure 5G:
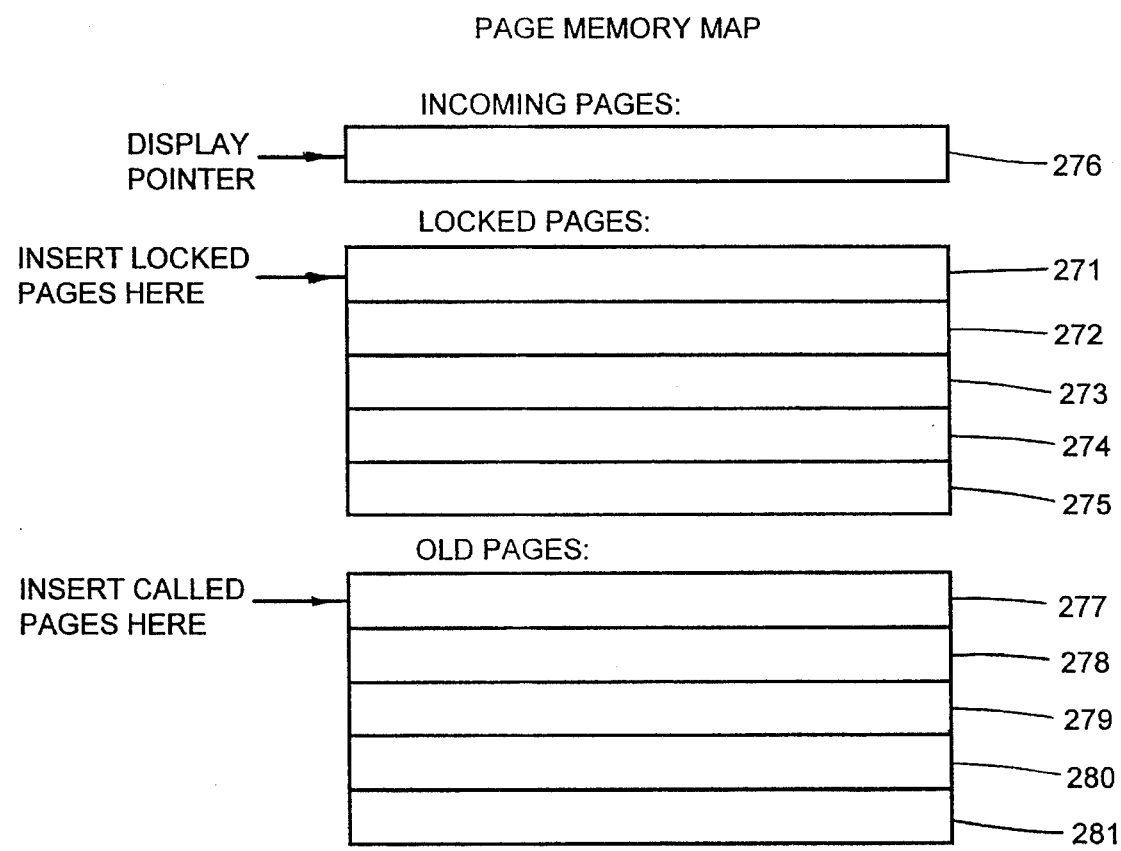
Figure 5H:
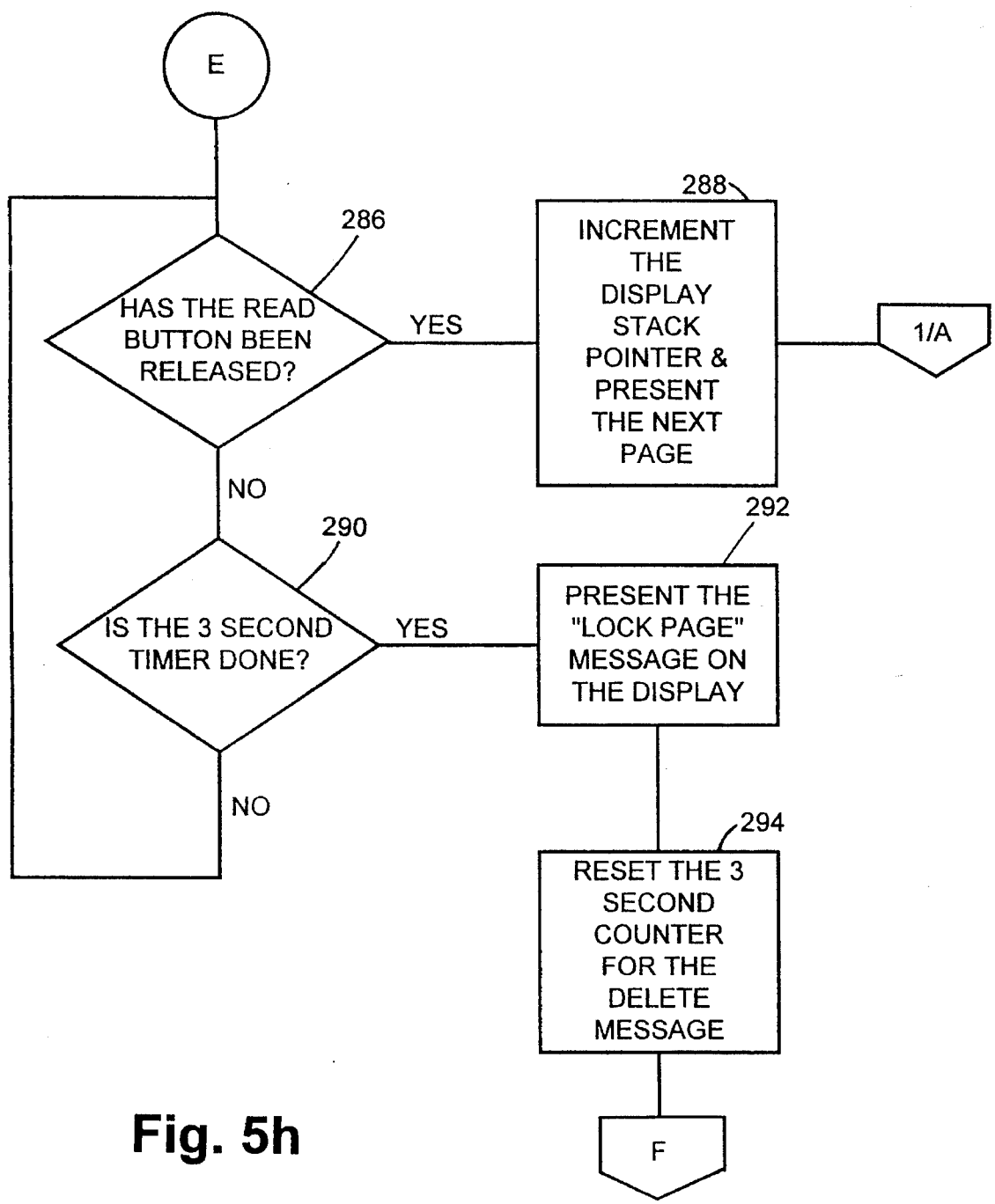
Figure 5I:
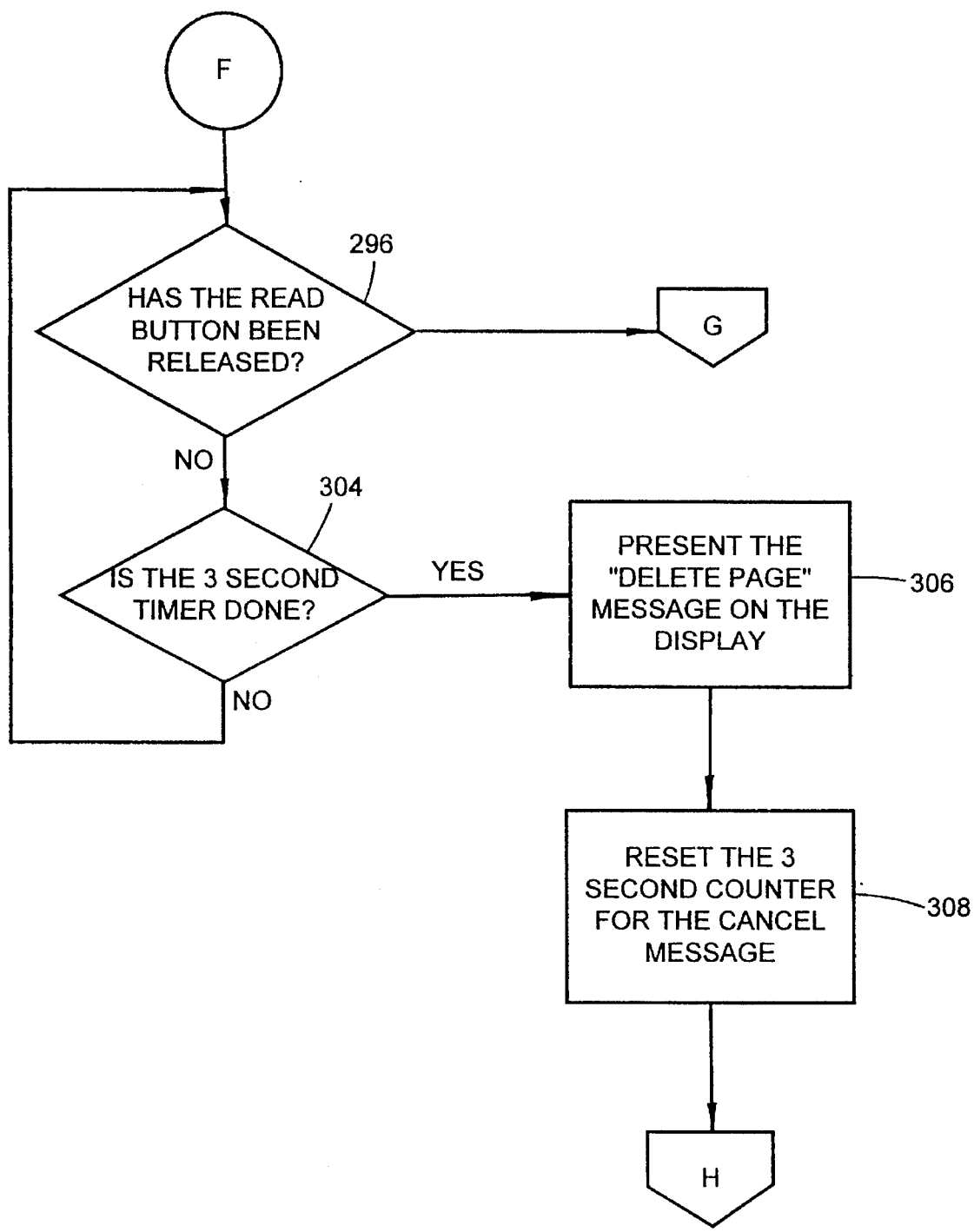
Figure 5J:
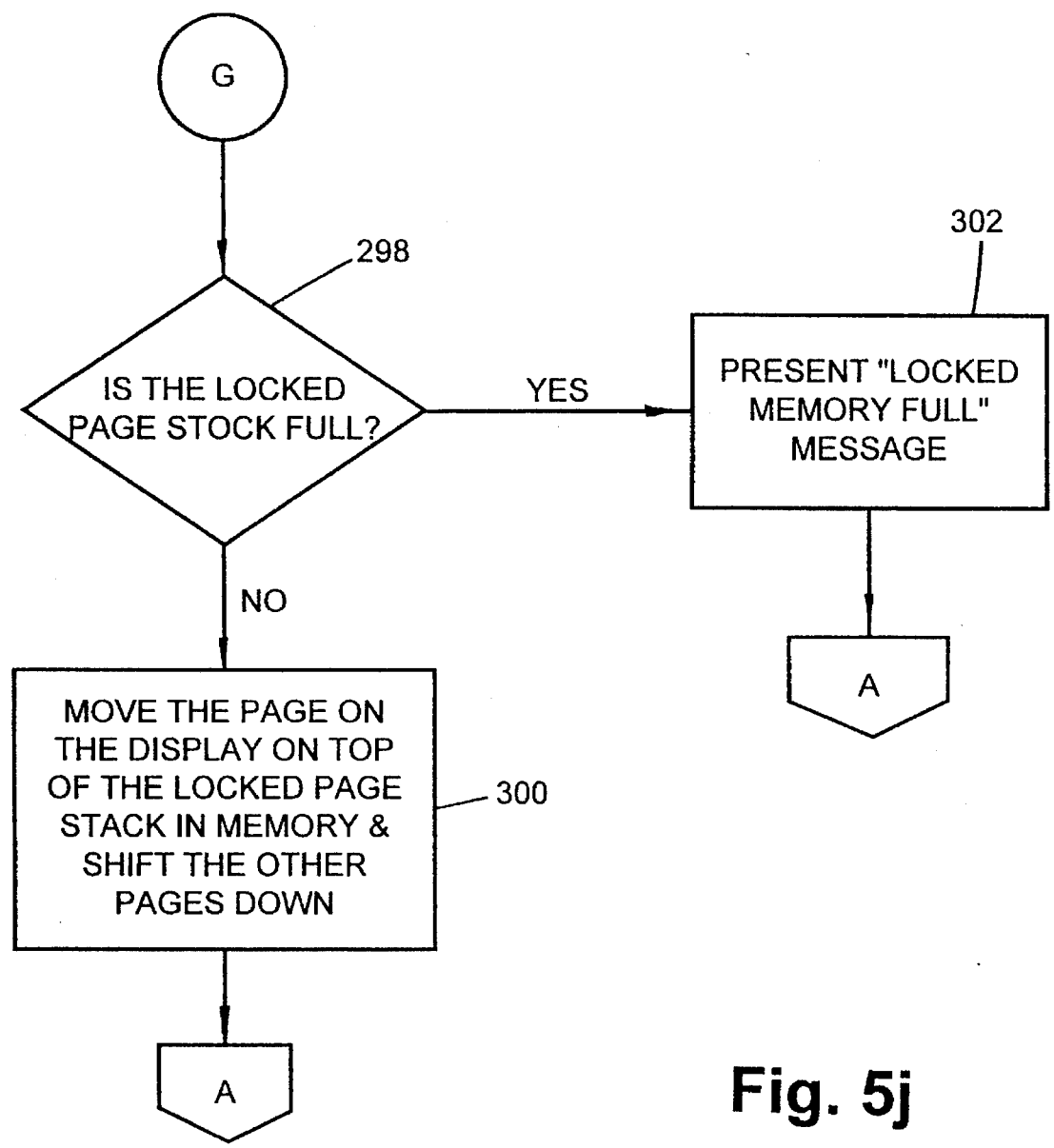
Figure 5K:
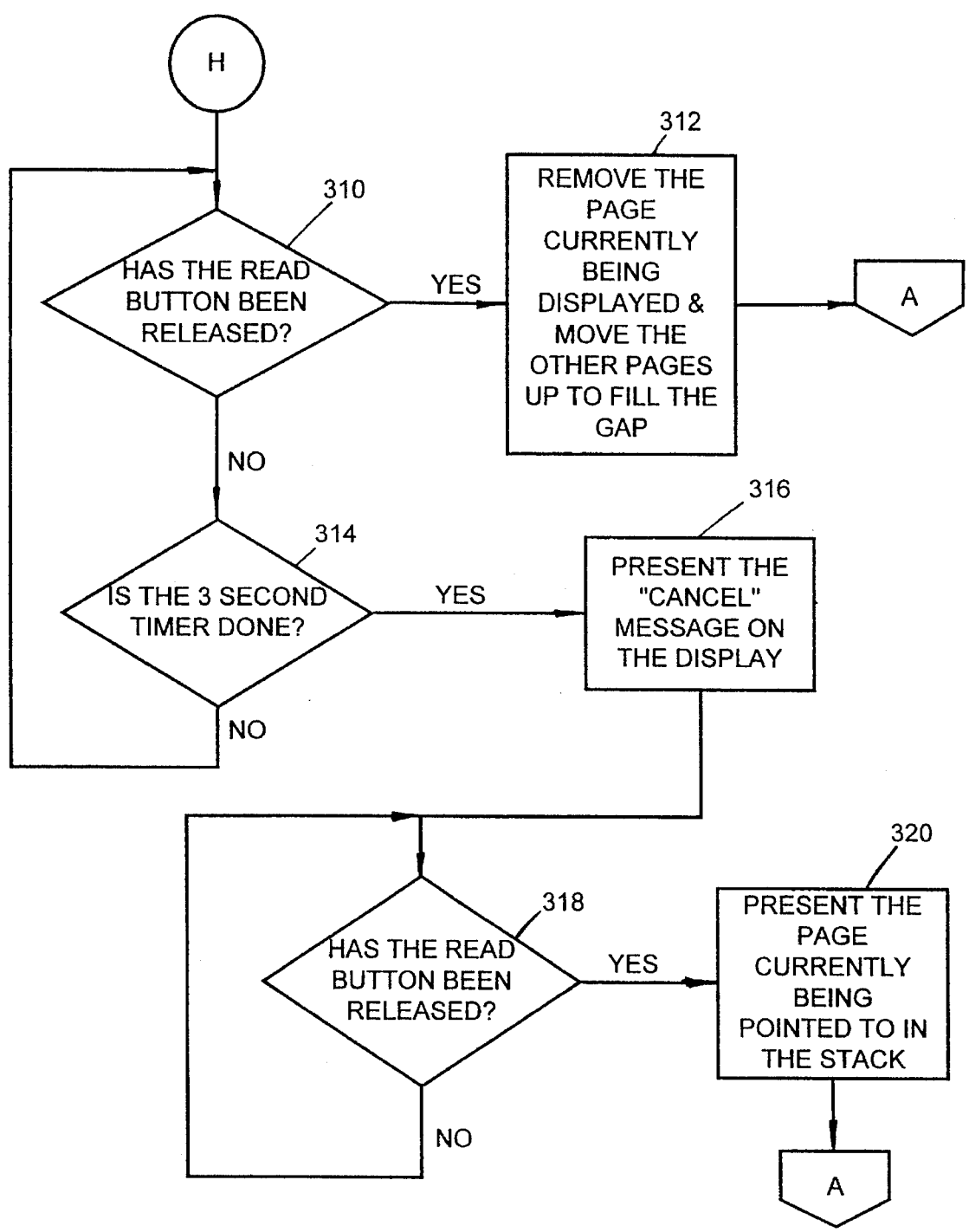
Figure 6:
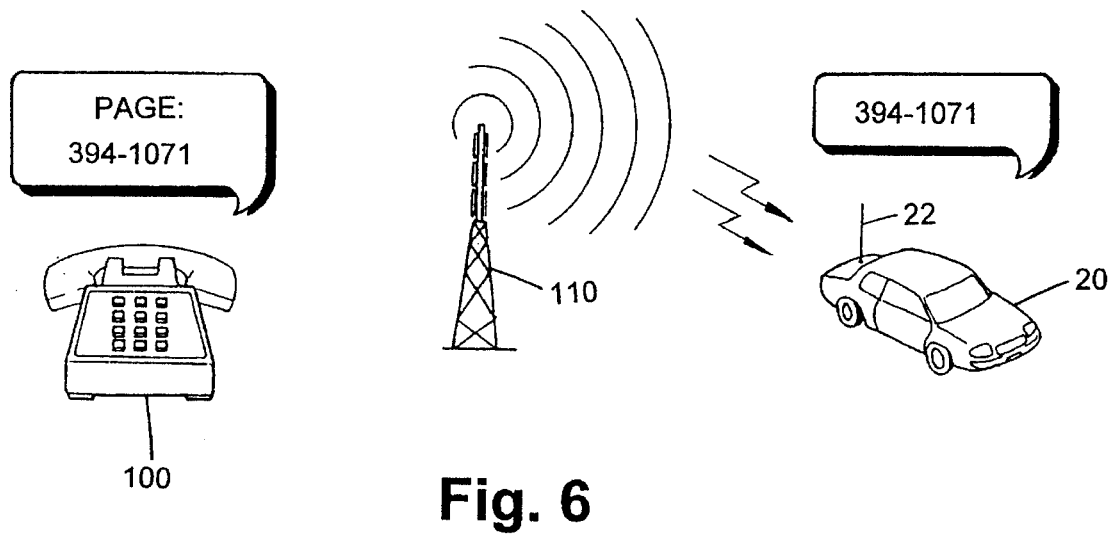
FIG. 6 is a schematic diagram of an alternative embodiment of the invention.
Figure 7:
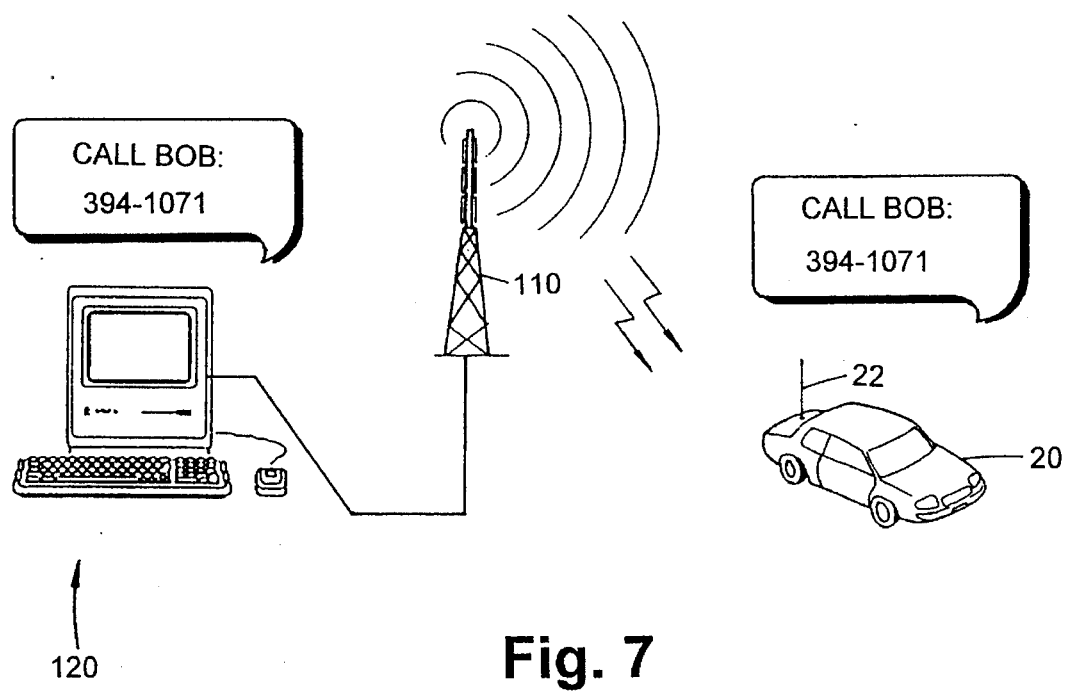
FIG. 7 is a schematic diagram of another alternative embodiment of the present invention.

Before describing the program of microcontroller 35, the alternative and/or additional embodiments of the invention set forth in FIGS. 6 and 7 are briefly described, it being understood that the system can have various levels of sophistication and the program described in connection with the flow diagram of FIG. 5 is for a system which incorporates all of the features including those of FIGS. 6 and 7. Referring to FIG. 6, a phone paging system can be provided in which a paging service is subscribed to by the vehicle operator and anyone desiring to reach the vehicle operator can call the paging company via a conventional telephone 100 in FIG. 6. The paging operator then transmits to the desired vehicle operator the number to be called. The person driving the vehicle and subscribing to the system has an individual vehicle address for receiving such pages.

In this system it is not necessary for the vehicle to include a cellular phone since only the number to call will be displayed on display 40. The paging service transmits through a conventional paging transmitter system represented by the pictorial icon 110 in FIG. 6. The paging service transmits the vehicle address and telephone number the pager wishes the driver to call through the receiving antenna 22 in vehicle 20. Vehicle 20 can include the same receiver as that shown in FIG. 3 and various remaining circuitry 30. In the FIG. 7 embodiment, the paging service allows the transmission and receipt of an alpha-numeric message as, for example, from a PC terminal 120 coupled by a modem or other suitable interconnection to the paging service facility 110 which again transmits alpha-numeric information to a vehicle 20 which is received by antenna 22 and demodulated by the receiver 24 shown in FIG. 3. The vehicle electrical system 30 displays and stores the alpha-numeric message on the display 40. As described in greater detail below in connection with the program for the microcontroller, several telephone numbers such as shown in the FIG. 6 embodiment or alpha-numeric messages which may include a telephone number as illustrated in FIG. 7, can be stored in memory and subsequently recalled on a single line display 44 used by the vehicle operator. Having described the hardware used in connection with the system of the present embodiment, a description of the programming for the microcontroller 35 and a general description of operation of the system is now presented in connection with FIGS. 5A–5K.

The software programming of the microcontroller 35 is shown in FIGS. 5A–5K. The main program includes an interrupt timer which periodically interrupts the main program to run an interrupt service routine shown in FIG. 5A. The interrupt service routine is initiated by block 200 upon expiration of the program timer and upon such event the power is applied to the receiver 24 as indicated by block 202 for sampling incoming signals for a period of 250 milliseconds. The demodulator looks for a preamble signal indicated by block 204. Each of the GSC and POCSAG paging formats provide a preamble digital signal and if one is not detected by the microcontroller, the interrupt counter is reset as indicated by block 206 and the interrupt subroutine and the program returns to the main program as indicated by block 208. The main program starts at block 252 as described below in connection with FIGS. 5E–5K. In the event a preamble is detected, however, as indicated by an affirmative decision in block 204, the receiver remains activated as indicated by block 210 for receiving one of two different vehicle addresses uniquely associated with the vehicle. If either of these addresses is received, as indicated by block 212, a correction subroutine as shown in FIG. 5B is conducted to assure that the address has been correctly received. The first vehicle address is one in which a vehicle option is to be changed by a subsequently transmitted control signal. The second address is one which is followed by a telephone number page or alpha-numeric message to be displayed. Each of these addresses are uniquely associated with a single vehicle.

The error correction routine is a standard subroutine for the different paging systems. The bit error correction subroutine is initiated as indicated by block 213 of FIG. 5B. The error correction subroutine 212 reads an address or message data block as indicated by block 214 and divides binary format constants indicated in block 216 for the respective paging formats and stores the remainder which is known as the syndrome as indicated by block 218. Then a test is conducted, as indicated by block 220, to determine whether the syndrome is zero. If it is, the data is correct and the program returns to the interrupt service routine from the bit error correction subroutine as indicated by block 222. If, however, the syndrome is not zero, the data is corrected by the bit indicated by the syndrome as shown by block 224 and the data retested through the loop including blocks 216-220.

Once the bit error correction subroutine has been completed and a correct paging preamble detected, the interrupt service routine proceeds to test as indicated in FIG. 5C, block 230, whether one of the vehicles' addresses has been detected. If no address is received for the particular vehicle into which the pre-programmed addresses of microcontroller 35 is installed, the program returns to port B of FIG. 5A as indicated by block 232 and the interrupt counter is reset and the program returns to the main page information display program described below.

If, however, one of the vehicle's addresses has been detected, the program tests, as indicated by block 234 (FIG. 5C), whether the address is a page information address or a option personalization address. If the vehicle owner or operator has called the service dealer asking that an option be activated or deactivated, the transmission of the address corresponding to the personalization code (i.e. first address) and the data corresponding to the activation of the option selected will be received and the control command decoded to provide a control signal to effect the option change as indicated by block 236 of FIG. 5C. The signal is then either outputted by one of the conductors 50-64 shown in FIG. 3 of microcontroller 35 or through the multiplex circuit 44 to the multiplex bus 42 for subsequent receipt by the vehicle's microcontroller 70 shown in FIG. 4 to effect the change in the vehicle option. The details of changing a vehicle option are described in the parent application. However, in most instances a bit or bytes are set into the NVM of microcontroller 35 to cause the vehicle option to respond as requested. Thus, for example, line 60 may send a control signal upon the selection of the "express window" feature to cause the driver's window to fully lower or raise in response to the activation of the window control switch for a predetermined period of time. This feature can be activated or deactivated by the setting of a switch in the microcontroller memory. As indicated by block 238, the microcontroller also provides a display output signal which is applied to the alpha-numeric display 40 to indicate to the owner that the option requested has been changed as requested. The program then returns to the interrupt service routine input B of FIG. 5A.

The anti-theft feature of the system operates in the same manner as one of the vehicle option changes. Typically, if a vehicle is stolen, the owner will call the service center 10 indicating the theft. The service center operator then will transmit the first vehicle address and an anti-theft control command signal which the microcontroller responds to by outputting a signal on line 62 (FIG. 4) to deactivate the vehicle's fuel pump. For safety, the program responds to the anti-theft command to output the fuel pump disabling signal only after the ignition switch has been deactivated and thus the vehicle has come to rest. Alternative or additional anti-theft commands are also possible. Thus, a theft alarm signal output on line 59 (FIG. 4) could be activated to enable the vehicle's audible alarm. Also, instead of deactivating the vehicle's fuel pump, the vehicle's ignition could be interrupted. In some areas, the police department may provide the anti-theft signal transmission facilities such that the owner can report the theft and take affirmative action to protect the vehicle from damage through one telephone call.

If the vehicle address received is not a first address for an option change or anti-theft control but instead is an address identifying a page message (i.e. a second address) as opposed to a vehicle option control signal, the test in block 234 indicates a page address and the program receives and decodes a page message as indicated by block 240 in FIG. 5C. Again, the bit error correction subroutine 212 of FIG. 5B is run to assure the accuracy of the incoming preamble and subsequent address and data as indicated by the block 212 subroutine. Once the subroutine of FIG. 5B has been completed, the message of the incoming page is placed in the page memory as indicated by block 242 of FIG. 5C. The program then proceeds to scan the page message to determine whether or not a phone number has been received as indicated by block 242 of FIG. 5D.

If a phone number is detected in the incoming message as indicated by an affirmative response to the test of block 244, the number is stored in the page stack as described below and the number received flag is set as indicated by block 246. The program then proceeds to block 248 and if a phone number was present it is displayed on the alpha-numeric display 40 of FIG. 3 in addition to being stored. This operation is indicated by block 248 of the flow diagram. Next, the microcontroller outputs a signal through the microcontroller indicated by block 250 to alert the owner that a page has been received. This can be a chime coupled to a vehicle multiplex bus 42 which is also used, for example, to alert the driver that a door is open with the key in the ignition etc., or can be a flashing LED or the like. Subsequent to alerting the driver that a page has been received, the program proceeds to the interrupt routine at input B of FIG. 5A as previously described.

The microcontroller program includes a main program which provides a variety of informational displays and message storing, erasing and display features for the vehicle operator in addition to the automatic remote vehicle option control described above. Thus, in addition to the interrupt routine described in connection with FIGS. 5A-5D, the main program for the microcontroller provides a variety of message storing, displaying and controlling functions as now described.

Referring to FIG. 5E, the main program of the microcontroller starts as indicated by block 252 upon power up and initializes memory pointers and flags as indicated by block 254. The input port A from the interrupt routine indicated in FIG. 5A precedes the program test indicated by block 256 of the status of transmit and read switches 45 and 41 respectively (FIG. 3). The program first tests to determine whether or not the transmit push-button switch was depressed as indicated by block 258 and if it was, it scans the page information displayed to determine whether or not a phone number exists. This is indicated by block 260 whereupon the program tests to determine whether a phone number was found in the page message as indicated by block 262 of FIG. 5F. It is noted that in FIGS. 5A-5K, the interconnections of the flow diagram ports are identified by corresponding letters.

If no phone number was found, display 40 displays the message no phone number as indicated by block 264 for three seconds and redisplays the current information, whereupon the program proceeds to input A of FIG. 5E and recycles. If a phone number was found, as indicated by a affirmative test in block 262, and the vehicle includes a cellular phone which is coupled through the multiplex bus 42 to the microcontroller 35, the vehicle operator can automatically dial the displayed paged phone number. For this purpose, the program presents a dialing message to the vehicle operator as indicated by block 266. If the operator wants to auto-dial the displayed number, the transmit or call button was actuated as previously indicated by the test of block 258 in FIG. 5E and the detection and display of a phone number in the page. The program then tests to determine whether or not phone connection was made by the cellular phone and if not, the program proceeds to block A of FIG. 5E and cycles through the test loop again. If a phone call was successfully placed, the call paged is advanced to the old paged stack as described in connection with FIG. 5G now described and the display pointer is reset thereupon the program returns to port A of FIG. 5E.

FIG. 5G illustrates the memory mapping for incoming pages. The program permits the vehicle operator to lock desired pages into a block of memory, for example, memory space for five alpha-numeric pages 271–275 is provided. These messages will be, depending upon the desired degree of sophistication for the system, numeric or alpha-numeric messages having 24 characters. The information can be displayed in the 20 character display 40 of FIG. 3 by sequentially displaying 12 characters at a time. This can be done automatically if desired, or the read switch 41 can be activated for scrolling to the second half of the displayed message. Incoming pages are displayed at the current page memory location 276 while the system includes five old page memories in a FILO storage system indicated by memory blocks 277–281. Locked pages, as discussed below, will remain in memory for future reference regardless of the number of incoming pages while the old pages, unless locked, will be sequentially dumped from the last memory location 281 upon receipt of incoming pages which bump the incoming message from the previous page from block 276 to block 277. This is indicated by block 270 of FIG. 5F of the flow diagram.

Returning now to FIG. 5E, if the transmit button has not been actuated as indicated by a negative decision on block 258, the program tests to determine whether or not the read switch 41 of FIG. 3 had been actuated as indicated by block 282. If the read switch was not depressed, the program cycles through tests 256, 258 and 282 with the periodic interrupt routine set forth in FIGS. 5A–5D being conducted to the interrupt to this main routine and check for incoming option control or message pages. If the read switch had been actuated, a three second counter for locking the message is reset as indicated by block 284. The program then proceeds to port E of FIG. 5H. How long the read switch is being depressed determines a variety of functions of the system. If the read switch is momentarily depressed (i.e. released within three seconds as indicated by the test of block 286,) the display stack pointer is incremented and the next page is displayed as indicated by block 288. If, however, the switch is held down beyond three seconds, as indicated by a negative test at block 286 and a positive result of test block 290, the program displays to the vehicle operator a lock page message inquiry asking the operator if the page (i.e. displayed message) should be placed in one of the locked page memory locations 271–275 shown in FIG. 5G. If upon receiving this prompt the vehicle operator releases the read switch, the previously displayed page information will be placed in a locked page memory location. At the time the lock page message is displayed, the three second counter for a delete message is reset as indicated by block 294 and the program proceeds to port F of FIG. 5I to determine whether or not the operator continues to depress the read switch. If the read switch has been released indicating the operator would like to lock the page into memory, test 296 of FIG. 5I will be affirmative and the program proceeds to port G of FIG. 5J.

The program then tests to determine if the locked page stack i.e. memory locations 271–275 are full as indicated by block 298. If not, the incoming page message being displayed is stored in memory block 271 and the remaining locked memory pages are shifted downwardly as indicated by block 300 (FIG. 5J). The program then returns to port A of FIG. 5E. If the locked page memory stack is full, an affirmative test at block 298 causes the message locked memory full to be displayed as indicated by block 302 to the vehicle operator and then the program returns to port A of FIG. 5E. This all occurs within the three to six second interval while the vehicle operator is holding the read button in a depressed condition.

If the read switch remains depressed beyond 6 seconds, as indicated by block 304 of FIG. 5I, the program tests to see if the previously reset three second timer has timed out, if not, it continues testing to determine whether or not the read switch has been released. If the three seconds (now six seconds total) has expired, the delete page message is displayed on the display 40 as indicated by block 306. This presents the vehicle operator a three second interval between the six and nine second time period in which to, as described below, delete the page from the memory. Initially the three second counter for the "cancel" message is reset as indicated by block 308. The program proceeds to input H of FIG. 5K. At this time, the operator has held the read switch in for a period of six seconds and a message "delete page" is being displayed. If the read switch is released, as indicated by block 310 in FIG. 5K, the displayed page is deleted from memory and the remaining memory pages are advanced as indicated by block 312 and the program proceeds to port A of FIG. 5E. If the displayed page is not desired to be deleted, the operator can hold the read switch down, as indicated by block 314, until the six to nine second time period has been exceeded and the three second timer again times out presenting a "cancel" message to the vehicle operator as indicated by block 316.

At this point in time, the vehicle operator can release the read switch 41 as indicated by block 318 and the current page is again displayed and the program returns to port A of FIG. 5E thus allowing the vehicle operator to cycle through the memory to determine whether or not the operator desires to insert a page into a locked memory location if the memory is full. Thus, by using a single switch 41, the vehicle operator can sequence through stored pages of display information including locked pages and insert pages into the locked page memory as desired. By only momentarily depressing the read button, the sequence of messages shown in FIG. 5G are displayed to the vehicle operator and if desired, any telephone number contained in any of such messages can be automatically dialed by actuating the transmit button when the message is currently displayed on display 40.

Thus, the system of the present invention provides a vehicle with a receiver for receiving a vehicle option control address and command signals for changing a vehicle option remotely and in a preferred embodiment one which can also receive a paging address and paging message. In a preferred embodiment the system is capable of both functions and the receipt of alpha-numeric messages which can be employed for automatically dialing a cellular phone if the vehicle has a phone installed and connected to the multiplex bus or otherwise directly wired to a serial data port such as an RS-232 port of microcontroller 35. Cellular telephones typically include input ports for such purpose. Similarly, the microcontroller interfaces with a plurality of vehicle accessories indicated by conductors 50-64 or through the multiplex computer 70 of FIG. 4 to such systems for activation or deactivation of a variety of vehicle options. It will become apparent to those skilled in the art that various modifications to the preferred embodiments of the invention as described herein can be made by those skilled in the art. Such modifications will fall within the scope and spirit of the present invention as defined by the appended claims.

APPENDIX A

GSC Paging Format

The GSC code format consists of a preamble, a start code, an address and one or more blocks of data. The blocks of data are transmitted at twice the bit rate as the start code and address.

Preamble

The preamble begins with a comma which is 14 bits of a reversal pattern, alternating zeroes and ones. The comma is followed by 18 repetitions of the same 23 bit pattern. There exist 10 different bit patterns in use today. This divides the population of GSC receiving pagers into ten groups. If a pager detects the bit pattern of it's group it will continue to receive the address otherwise it will return to it's low current mode. This way the receiver need only sample often enough to assume that the preamble is detected and pages won't be missed.

PREAMBLE:

| COMMA | 1 | 2 | 3 | 4 | 5 | 6 | ... | 17 | 18 |
|-------|---|---|---|---|---|---|-----|----|----|

↙ Each words contains 23 bits

Start Code

The start code marks the end of the preamble and signals that an address if to follow. It also provides timing information when pages are being sent in batches.

Address

The start code and address being with a comma followed by two 23-bit words. These bits are transmitted at 300 bits per second. The two words provide enough data to uniquely define 100,000 different addresses and correct errors in transmission.

START CODE & ADDRESS:

| COMMA | WORD 1 | WORD 2 |
|-------|--------|--------|

↘ 1/2 Bit space

Word Format

Each 23 bit word begins with 12 information bits followed by 11 parity bits. The parity bits are includes to provide a way of detecting bit errors and correcting them. Eleven parity bits are sufficient to correct at most 3 bit errors per word.

WORD FORMAT:

| Information-12 bits | Parity-12 bits |
|---------------------|----------------|

Data Block Format

Each block of data begins with a half bit space followed by 8 words of 15 bits each. These bits are transmitted at 600 bits per second which is twice as fast as start code and address bits. The information in each word contains error detection and correction bits but only allows for upper case characters when sending alpha-numeric data. POCSAG Paging Format

POCSAG Format

The POCSAG code format consists of a preamble and one or more batches of data codewords. The batches are separated by a frame synchronization code.

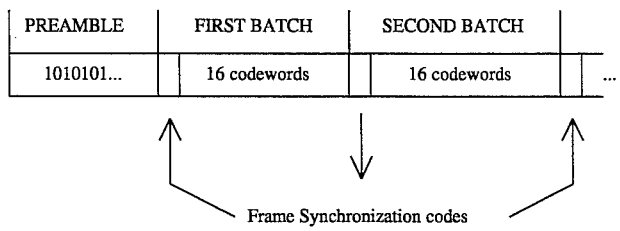

Preamble

The preamble is 576 bits of a reversal pattern, alternating zeros and ones. It is included to alert the receiver that data is to follow, This way the receiver need only sample often enough to assure that the preamble is detected and pages won't be missed.

Preamble:

| 101010101... for a total of 576 bits |

Frame Synchronization Code

The frame synchronization (FS) code is a unique combination of 32 bits. The FS is used to identify the beginning of each batch of and to provide a starting point by which the frames of data within each batch can be counted.

Frame Synchronization Code (32 bits):

| 01111100110100100001010111011000 |

Batch

Each batch of data begins with a FS and is followed by 8 frames of data. Each frame of data must contain 2 codewords. Each codeword is 32 bits long. If a page requires an odd number of codewords an extra idle codeword is used to complete the frame. The idle codeword is a unique pattern like the FS.

Codeword Structure

Each codeword is 32 bits in length. The first bit indicates the type of data that the codeword contains. A zero in the first bit indicates that the codeword contains address data. A one in the first bit indicates that the codeword contains message data. In each type of codeword the data is in bits 2 thru 21. Bits 22 thru 32 are used as parity bits for error detection and correction algorithms.

Codeword Bit number:

| 1 | 2 thru 19 | 20 | 21 | 22 thru 31 | 32 |

Address Codeword:

| 0 | Address bits | Source Id | Parity bits | Even |

Message Codeword:

| 1 | Message bits | Parity bits | Even |

Address Codeword

This codeword contains an address in bits 2 thru 19 which makes this page specific to one pager within the population of pagers. Included in the 18 bit address are three bits which define the frame (0 thru 7) in which the next codeword will be found. The next 2 bits, 20 and 21 identify the source as being from one of four groups of sources within an area. The next 10 bits (22 thru 31) are included for error detection and correction and the last bit (32) provides even parity.

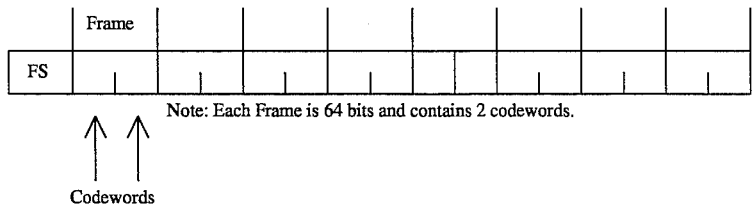

Idle Code (32 bits):

| 01111010100010011100000110010111 |

Message Codeword

This codeword contains a 20 bit message of any information in bits 2 thru 21. The integrity of these information bits is protected by the error detection and correction routines as the address codewords above. The information bits contain alpha-numeric data encoded as 7 bit ASCII characters.

The embodiments of the invention in which an exclusive property or privilege is claimed are defined as follows.

1. A method of reprogramming accessories in a plurality of vehicles from a land based transmission facility comprising the steps of:

transmitting a programming signal from the transmission facility, said programming signal including address information and control information for reprogramming the operation of a vehicle accessory;

receiving the programming signal in a vehicle receiver in each vehicle;

determining in each vehicle if the address of the programming signal matches the address associated with the vehicle; and reprogramming controlled electrical accessories through the vehicle's electrical system according to the control information in the programming signal for the vehicle in which the address information and vehicle's address match, such that the vehicle's controlled electrical accessories are selectively reprogrammed according to control information transmitted from said transmission facility, wherein reprogramming the vehicle's controlled accessories changes the manner in which the vehicle accessories operate upon reception of vehicle operator initiated operation signals.

2. The method as defined in claim 1, wherein said receiver receives paging signals and programming signals and said step of receiving includes comparing received address information to a stored address to determine if the address information is the address of the vehicle.

3. The method as defined in claim 2, wherein:

said step of receiving includes comparing the received address information to two stored addresses; and said step of reprogramming vehicle accessory operation reprograms accessory operation if the received address is the same as a first stored address and said method further including a step of displaying a paging message if the received address is the same as a second stored address.

4. The method as defined in claim 3, wherein said step of transmitting includes transmitting said programming signal using a paging signal source.

5. The method as defined in claim 1 wherein said programming signal includes address information and control information for reprogramming the operation of a side window, and wherein the step of reprogramming includes changing the manner in which the side window operates in response to an operation signal that is generated when a person operates a window control switch.

6. A vehicle option programming system for the remote reprogramming of accessories in a vehicle comprising:

an electrically operated vehicle accessory;

a vehicle accessory controller connected to said vehicle accessory for controlling the operation of said vehicle accessory upon reception of a vehicle operator initiated operation signal;

a receiver to be located in a vehicle for receiving paging signals from a land based paging transmitter, wherein the paging signals include an address uniquely identifying the vehicle and a control signal for reprogramming the operation of said vehicle accessory;

a multiplex bus communicatively coupled to said vehicle accessory controller;

a multiplex circuit communicatively coupled to said bus; and a control circuit communicatively coupled to said receiver and to said multiplex circuit and responsive to the detection of an address identifying the vehicle and said control signal, for selectively reprogramming the operation of said vehicle accessory in response to said control signal by changing the manner in which said vehicle accessory controller controls the operation of said vehicle accessory upon reception of the vehicle operator initiated operation signal.

7. The system as defined in claim 6 and further including a display communicatively coupled to said control circuit for displaying information to the vehicle operator indicating that a vehicle accessory has been reprogrammed.

8. The system as defined in claim 7 wherein said control circuit includes a memory for storing an address unique to the vehicle and compares an incoming address with said stored address to determine if the vehicle is receiving a control signal.

9. The system as defined in claim 8 wherein said control circuit memory stores a first and a second address each of which are unique to a vehicle and wherein said first address is employed to identify a control signal for reprogramming the operation of an accessory.

10. The system as defined in claim 9 wherein said control circuit responds to the receipt of said second address to apply a page message following said second address to the display for display to the vehicle operator.

11. The system as defined in claim 10 wherein said control circuit includes a microcontroller.

12. The system as defined in claim 11 and further including a least one land based transmitting facility for transmitting at least one of the combination of said first address and control signal and the combination of said second address and page message.

13. The system as defined in claim 6, wherein said paging signal includes an address and a control signal for reprogramming the operation of a side window, and wherein said control circuit reprograms the operation of the side window by changing the manner in which a controller for the side window controls the side window in response to an operation signal that is generated when a person operates a window control switch.

14. A system for the remote programming of vehicle accessories to reprogram the operation of said accessories comprising:

at least one land based transmitting facility for receiving instructions from a vehicle operator and initiating transmission of RF programming signals for reception by a vehicle, said RF programming signals including an address uniquely identifying a predetermined vehicle and accessory control information;

a vehicle receiver for receiving said RF programming signals;

a vehicle electrical system, said vehicle electrical system including a multiplex bus and at least one controlled accessory having a controller communicatively coupled to said multiplex bus for controlling said at least one controlled accessory in response to a vehicle operator initiated operation signal; and a control circuit communicatively coupled to said receiver and to said vehicle electrical system for determining if a received paging signal includes an address which is the address uniquely identifying the vehicle and responsive thereto for reprogramming the operation of said controlled accessory in response to said accessory control information by changing the manner in which said controller controls the operation of said at least one controlled accessory upon reception of the vehicle operator initiated operation signal.

15. The system as defined in claim 14 and further including a display communicatively coupled to said control circuit for displaying information to the vehicle operator indicating that a vehicle accessory has been reprogrammed.

16. The system as defined in claim 15 wherein said control circuit includes a memory for storing an address unique to the vehicle and compares an incoming address with said stored address to determine if the vehicle is receiving a control signal.

17. The system as defined in claim 16 wherein said control circuit memory stores a first and a second address each of which are unique to a vehicle and wherein said first address is employed to identify a control signal for reprogramming the operation of an accessory.

18. The system as defined in claim 17 wherein said control circuit responds to the receipt of said second address to apply a page message following said second address to the display for display to the vehicle operator.

19. The system as defined in claim 14 wherein said control circuit includes a microcontroller.

20. The system as defined in claim 14 and further including a least one land based transmitting facility for transmitting at least one of the combination of said first address and option control signal and the combination of said second address and page message.

21. The system as defined in claim 14, wherein said RF programming signals include an address and accessory control information for reprogramming the operation of a side window, and wherein said control circuit reprograms the operation of the side window by changing the manner in which a controller for the side window controls the side window in response to an operation signal that is generated when a person operates a window control switch.

22. A vehicle option programming system for the remote reprogramming of accessories in a vehicle comprising:

an electrically operated vehicle accessory operative in response to a vehicle operator initiated operation signal;

a receiver to be located in a vehicle for receiving paging signals from a land based paging transmitter, wherein the paging signals include an address uniquely identifying the vehicle and a control signal for reprogramming the operation of said vehicle accessory; and a control circuit communicatively coupled to said receiver and to said vehicle accessory and responsive to the detection of an address identifying the vehicle and said control signal for selectively reprogramming the operation of said vehicle accessory in response to said control signal, wherein reprogramming said vehicle accessory changes the manner in which said vehicle accessory operates upon reception of the vehicle operator initiated operation signal.

23. The system as defined in claim 22, wherein said paging signals include an address and a control signal for reprogramming the operation of a side window, and wherein said control circuit reprograms the operation of the side window by changing the manner in which a controller for the side window controls the side window in response to an operation signal that is generated when a person operates a window control switch.

* * * * *

UNITED STATES PATENT AND TRADEMARK OFFICE
CERTIFICATE OF CORRECTION

PATENT NO.   : 5,479,157
DATED        : December 26, 1995
INVENTORS    : Michael J. Suman et al.

It is certified that error appears in the above-identified patent and that said Letters Patent is hereby corrected as shown below:

Column 1, line 54;

"land based" should be --land-based--.

Column 1, line 56;

"land based" should be --land-based--.

Column 5, line 1;

"scrolls" should be --scroll--.

Column 5, line 2;

"allows" should be --allow--.

Column 7, lines 28 and 29;

"a option" should be --an option--.

Column 12, line 3;

"if" should be --is--.

Column 12, line 26;

"includes" should be --included--.

UNITED STATES PATENT AND TRADEMARK OFFICE
CERTIFICATE OF CORRECTION

PATENT NO. : 5,479,157
DATED : December 26, 1995
INVENTORS : Michael J. Suman et al.

It is certified that error appears in the above-identified patent and that said Letters Patent is hereby corrected as shown below:

Column 12, lines 44 and 45;

Delete "POCSAG Paging Format".

Column 13, line 3;

Center Arrow "↓" should be --↑--.

Column 13, line 17;

"follow," should be --follow.--.

Column 13, line 47;

Insert --Batch:--.

*Column 15, line 11;

"land based" should be --land-based--.

*Column 15, line 66;

"land based" should be --land-based--.

*Column 16, line 36;

"land based" should be --land-based--.

UNITED STATES PATENT AND TRADEMARK OFFICE
CERTIFICATE OF CORRECTION

PATENT NO. : 5,479,157
DATED : December 26, 1995
INVENTORS : Michael J. Suman et al.

It is certified that error appears in the above-identified patent and that said Letters Patent is hereby corrected as shown below:

Column 16, line 51;

"land based" should be --land-based--.

Column 17, line 29;

"land based" should be --land-based--.

Column 18, line 13;

"land based" should be --land-based--.

Abstract, line 8;

"when has" should be --when it has--.

Abstract, line 14;

"when" should be --which--.

Signed and Sealed this

Fourth Day of June, 1996

*Attest:*

BRUCE LEHMAN

*Attesting Officer*   *Commissioner of Patents and Trademarks*